(12) United States Patent
McDougal et al.

(10) Patent No.: US 8,627,404 B2
(45) Date of Patent: Jan. 7, 2014

(54) DETECTING ADDITION OF A FILE TO A COMPUTER SYSTEM AND INITIATING REMOTE ANALYSIS OF THE FILE FOR MALWARE

(75) Inventors: Monty D. McDougal, St. Paul, TX (US);
Bradley T. Ford, Wylie, TX (US);
William P. Smelser, Draper, UT (US);
Jason R. Clinton, Highland, UT (US);
Morgan J. Greenwood, Saratoga Springs, UT (US)

(73) Assignee: Raytheon Company, Waltham, MA (US)

( * ) Notice: Subject to any disclaimer, the term of this patent is extended or adjusted under 35 U.S.C. 154(b) by 21 days.

(21) Appl. No.: 13/216,317

(22) Filed: Aug. 24, 2011

(65) Prior Publication Data

US 2013/0055338 A1    Feb. 28, 2013

(51) Int. Cl.
*G06F 15/16* (2006.01)

(52) U.S. Cl.
USPC ............................................................. 726/1

(58) Field of Classification Search
USPC ....................................................... 726/1–36
See application file for complete search history.

(56) References Cited

U.S. PATENT DOCUMENTS

| | | | |
|---|---|---|---|
| 8,127,358 B1* | 2/2012 | Lee | 726/24 |
| 8,230,510 B1* | 7/2012 | Yang et al. | 726/24 |
| 2005/0204172 A1* | 9/2005 | Malcolm | 713/201 |
| 2007/0028291 A1* | 2/2007 | Brennan et al. | 726/1 |
| 2008/0052395 A1* | 2/2008 | Wright et al. | 709/224 |
| 2010/0235919 A1* | 9/2010 | Adelstein et al. | 726/25 |

* cited by examiner

*Primary Examiner* — Peter Shaw
*Assistant Examiner* — Don Zhao
(74) *Attorney, Agent, or Firm* — Schwegman, Lundberg & Woessner, P.A.

(57) ABSTRACT

In certain embodiments, a computer system includes a memory unit and a processing unit. The processing unit executes a monitoring module stored on the computer system. The monitoring module monitors the computer system for addition of a file to the computer system and detects an addition of a file to the computer system. The monitoring module accesses policies to determine whether to communicate information associated with the detected addition of the file over a communication network to a remote malware analysis system to initiate a possible malware analysis of the file by the remote malware analysis system. The monitoring module initiates, in response to determining to communicate information associated with the detected addition of the file, communication over the communication network of information associated with the detected addition of the file to the remote malware analysis system, the remote malware analysis system operable to analyze the file for malware.

17 Claims, 4 Drawing Sheets

DETECTING ADDITION OF A FILE TO A COMPUTER SYSTEM AND INITIATING REMOTE ANALYSIS OF THE FILE FOR MALWARE

BACKGROUND

Malware (such as viruses, trojans, and other malicious software) has become increasingly difficult to protect against. Various methods have been used to combat malware, but more sophisticated malware continues to abound. Methods of detection have grown more complex but often these take longer to execute as a result of this complexity. Current, host-level malware protection systems search for files these systems can detect as being malware. However, malware protection limited to host systems is susceptible to numerous types of attacks. For example, zero-day attacks remain particularly problematic.

SUMMARY

In certain embodiments, a computer system includes a memory unit and a processing unit. The processing unit executes a monitoring module stored on the computer system. The monitoring module monitors the computer system for addition of a file to the computer system and detects an addition of a file to the computer system. The monitoring module accesses policies to determine whether to communicate information associated with the detected addition of the file over a communication network to a remote malware analysis system to initiate a possible malware analysis of the file by the remote malware analysis system. The monitoring module initiates, in response to determining to communicate information associated with the detected addition of the file, communication over the communication network of information associated with the detected addition of the file to the remote malware analysis system, the remote malware analysis system operable to analyze the file for malware.

Particular embodiments of the present disclosure may provide one or more technical advantages. In certain embodiments, the present disclosure allows host-level detection of addition of a file to a computer system, as well as communication of the file (and other information) over a communication network to a remote malware analysis system for a malware analysis to be performed on the file by the remote malware analysis system. This host-level monitoring may allow for desired detection of certain types of files, such as downloaded files, files added through web-based email, and files added from a removable medium (e.g., a flash drive). Communication of these files to a remote malware analysis system may allow for more robust malware analysis to be performed than might be possible or practical with typical host-based or other local malware analysis systems. In certain embodiments, communication of these files to a remote malware analysis system may be performed according to one or more policies, which may provide control over which files are communicated to the remote malware analysis system and what information is communicated to the remote malware analysis system.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
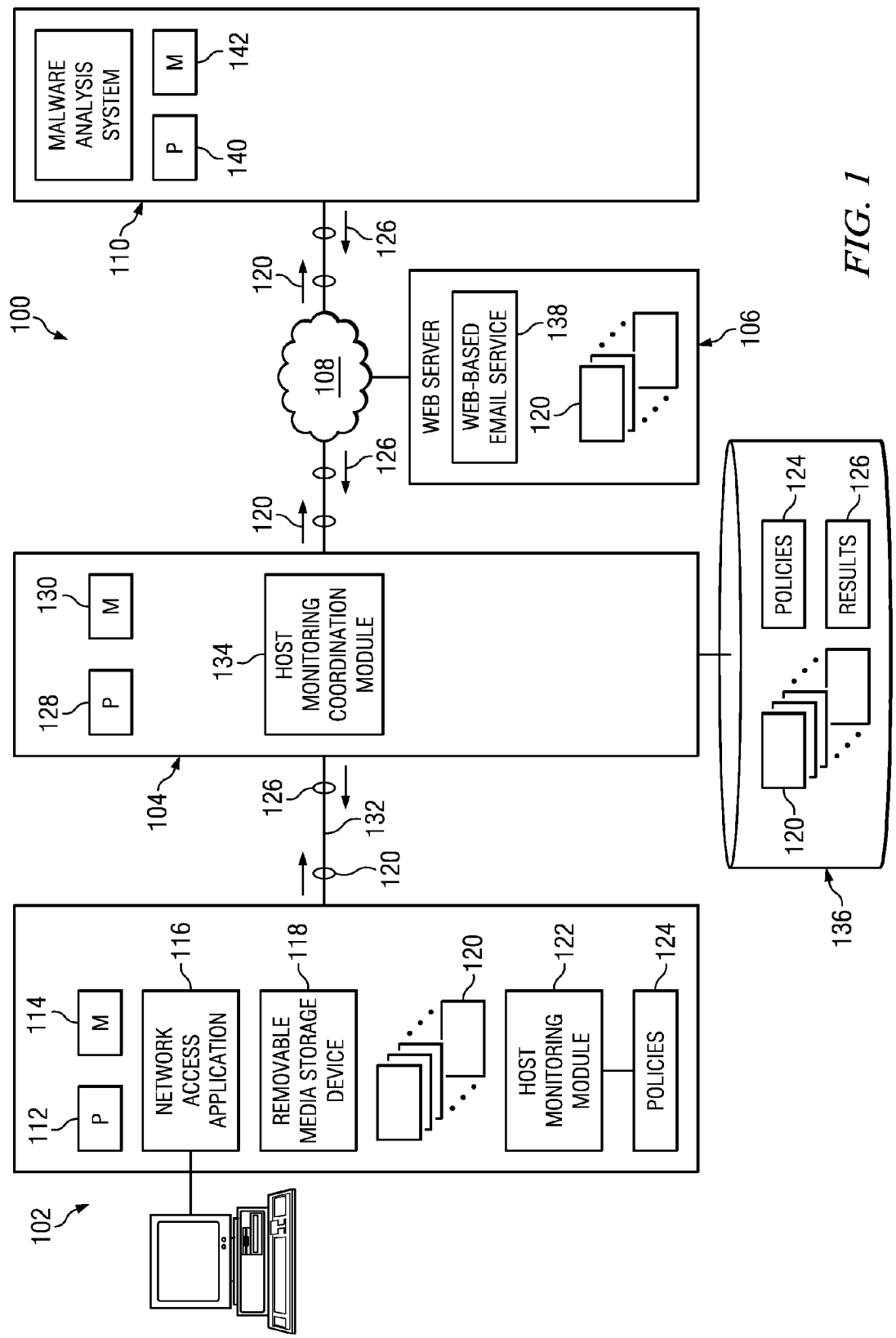
FIG. 1 illustrates an example system for detecting addition of a file to a computer system and initiating remote analysis of the file for malware, according to certain embodiments of the present disclosure.

FIG. 1 illustrates an example system 100 for detecting addition of a file to a computer system and initiating remote analysis of the file for malware, according to certain embodiments of the present disclosure. In the illustrated example, system 100 includes a user system 102, a processing system 104, a web server 106, a communication network 108, and a malware analysis system 110. Although system 100 is illustrated and primarily described as including particular numbers and types of components arranged in a particular manner, the present disclosure contemplates system 100 including any suitable numbers and types of components arranged in any suitable manner, according to particular needs.

In general, according to certain embodiments of the present disclosure, user system 102 is monitored for addition of a file to user system 102. For example, the file may be added to user system 102 from a removable media storage device, via a network connection, from a web-based electronic mail service, and/or from other suitable sources. In response to a detected addition of a file to user system 102, policies may be accessed to determine whether to communicate information associated with the detected addition of the file over communication network 108 to remote malware analysis system 110 to initiate a possible malware analysis of the file by remote malware analysis system 110. The information may include a copy of the file and/or any other suitable information. In response to a determination to communicate information associated with the detected addition of the file, the information may be communicated over communication network 108 to remote malware analysis system 110. Remote malware analysis system 110 may analyze the file for malware.

User system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more cellular/smart phones one or more servers, a server pool, one or more processors within these or other devices, or any other suitable processing device. User system 102 may be a stand-alone computer or may be a part of a larger network of computers associated with an entity. User system 102 may be implemented using any suitable combination of hardware, firmware, and software. User system 102 and user of user system 102 may be used interchangeably throughout this description. User system 102 may be one of a number of user systems 102.

User system 102 may include a processing unit 112 and a memory unit 114. Processing unit 112 may include one or more microprocessors, controllers, or any other suitable computing devices or resources. Processing unit 112 may work, either alone or with other components of system 100, to provide a portion or all of the functionality of its associated computer system 102 described herein. Memory unit 114 may take the form of volatile or non-volatile memory including, without limitation, magnetic media, optical media, read-access memory (RAM), read-only memory (ROM), removable media, or any other suitable memory component.

In general, user system 102 may be used by end users to perform any suitable computing functions. In the illustrated example, user system 102 includes a network access application 116, removable media storage device 118, one or more files 120, host monitoring module 122, and one or more policies 124, each of which may be implemented using any suitable combination of hardware, firmware, and software. In general, network access application 116 and removable media storage device 118 provide two mechanisms by which files 120 may be stored or otherwise added to user system 102. Each of these is described in greater detail below.

Network access application 116 may include any suitable application (or combination of applications) that is operable to access a computer network, such as the Internet. For example, network access application 116 may be a web browser. Network access application 116 may be used to transfer (e.g., copy or move via a download operation) files 120 to user system 102. As a particular example, network access application 116 may be used to access a web-based electronic mail service (e.g., web-based email service 138 of web server 106, described below), and to download attachments to accessed web-based email messages. Examples of web-based email include WINDOWS LIVE™ HOTMAIL® service operated by Microsoft Corporation, YAHOO! MAIL service operated by Yahoo! Inc., GMAIL™ service operated by Google Inc., and MOBILEME® service operated by Apple Inc. A user of user system 102 may access web-based email by accessing a web site hosting the web-based email (e.g., HOTMAIL.COM), often providing a username and password, and accessing emails via the web site. A user of user system 102 may download emails and/or associated email attachments to user system 102. Downloading a file 120 generally includes storing an instance of the file 120 in the memory (e.g., memory unit 114) of user system 102.

Removable media storage device 118 may include any suitable type of storage media that may be removably attached to user system 102 and used to add files 120 to user system 102. For example, removable media storage device 118 may include any suitable combination of flash storage devices, optical media storage devices, magnetic media storage devices, and any other suitable type of removable media devices. User system 102 may include appropriate hardware, firmware, and/or software for accessing and interacting with data (e.g., files) stored on removable media storage device 118, such as one or more Universal Serial Bus (USB) ports, one or more optical drives, one or more floppy disk drives, and any other suitable components.

Files 120 may have any suitable format, according to particular needs. For example, a file 120 may include one or more of the following in any suitable combination: (1) a data file; (2) a data record; (3) an email message; (4) an attachment to an email message; (5) a Uniform Resource Locator (URL) or other suitable address identifier; (6) executable content; and (7) any other suitable target object for which malware detection may be appropriate. Example files 120 may include MICROSOFT WORD files, PDF files, any type of email attachment, TXT files, EXE files, DLL files, sand any other suitable types of files. In certain embodiments, the term file as used herein may refer to a collection of files. For example, a ZIP file or other archive or compressed file type may include multiple embedded files. The present disclosure contemplates user system 102 having any suitable number of files 120.

Host monitoring module 122 may monitor user system 102 for various events. For example, host monitoring module 122 may be an application such as an agent that is stored locally on user system 102 (e.g., in memory unit 114) and is operable to monitor user system 102 for various events. In certain embodiments, these events include the addition of one or more files 120 to user system 102. In certain embodiments, host monitoring module 122 is operable to monitor user system 102 for a variety of other events, as well.

Addition of a file 120 to user system 102 may include an attempt to add file 120 to user system and/or actual addition file 120 to user system 102. In other words, for purposes of the present disclosure, monitoring user system 102 for addition of a file 120 to user system 102 may include monitoring user system 102 for attempts to add files 120 to user system 102 and/or actual additions of files 120 to user system 102, and detecting addition of a file 120 to user system 102 may include detecting an attempts to add files 120 to user system 102 and/or detecting actual additions of files 120 to user system 102. Host monitoring module 122 may also detect addition of a file to user system 102. In certain embodiments, host monitoring module 122 may monitor user system 102 for files 120 added by particular techniques. Although detection of the addition of a file 120 added by particular techniques is described, the present disclosure contemplates detection of the addition of a file 120 added in any suitable manner, according to particular needs.

In certain embodiments, host monitoring module 122 may monitor user system 102 for addition of a file 120 to user system 102 by monitoring user system 102 for addition of a file 120 from removable media storage device 118 to user system 102, and may detect an addition of a file 120 to user system 102 by detecting an addition of a file 120 from removable media storage device 118 to user system 102. In certain embodiments, host monitoring module 122 may monitor user system 102 for addition of a file 120 to user system 102 by monitoring user system 102 for addition of a file 120 to user system 102 via a network connection, and may detect an addition of a file 120 to user system 102 by detecting a transfer to user system 102 of a file 120 via the network connection (e.g., a browser download, a peer-to-peer file transfer, a transfer using any suitable network-enabled application, or other suitable mechanism). In certain embodiments, host monitoring module 122 may monitor user system 102 for addition of a file 120 to user system 102 by monitoring user system 102 for addition of a file 120 from a web-based electronic mail service to user system 102, and may detect an addition of a file 120 to user system 102 by detecting a transfer of a file from the web-based electronic mail service to user system 102. As an example, the file may be an attachment to an email accessed using the web-based electronic mail service, and monitoring user system 102 for addition of a file 120 from a web-based electronic mail service to user system 102 includes monitoring user system 102 for a download of the attachment from the web-based electronic mail service to user system 102. Host monitoring module 122 may detect addition of a file 120 from the web-based electronic mail service to user system 102 by detecting a transfer of the attachment from the web-based electronic mail service to user system 102.

It may be appropriate to communicate a file 120 that has been added or is being added to user system 102 to a remote malware analysis system (e.g., malware analysis system 110) for a malware analysis to be performed on the file 120. Host monitoring module 122 may be operable to determine when to send a file 120 to the remote malware analysis system, as well as what information to send along with the file 120. Examples of what information may be sent are described below with reference to FIG. 4.

Policies 124 may provide rules that are used by host monitoring module 122 to determine when to send files 120 to remote malware analysis system 110, as well as what information to send to remote malware analysis system 110. Policies 124 may take any suitable format and may be implemented in any suitable manner. For example, policies 124 may be implemented as one or more rule files that are accessed by host monitoring module 122. As another example, policies 124 may be implemented as a number of conditions and corresponding actions that are written into the code of host monitoring module 122. Example policies 124 are described in greater detail below.

Host monitoring module 122 may receive results 126 in response to communicating a file 120 to remote malware analysis system 110. A result 126 may include one or more of the following: a result of the analysis performed by malware analysis system 110; an action to be performed by user system 102 based on a result determined by malware analysis system 110; and any other suitable information. As a particular example, the result of the analysis performed by malware analysis system 110 may indicate whether or not malware analysis system 110 is or otherwise includes malware. As another particular example, in response to malware analysis system 110 determining that the file 120 is or otherwise includes malware, an action to be performed by user system 102 may include one or more of preventing the file 120 from being added to user system 102, deleting an already-added file 120 from user system 102, communicating a notification to one or more devices, and any other suitable action. As another particular example, in response to malware analysis system 110 determining that the file 120 is not or otherwise does not include malware, an action to be performed by user system 102 may include allowing the file 120 to be added to user system 102, communicating a notification to one or more devices, and any other suitable action.

System 100 may include processing system 104. Processing system 104 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, switch, router, disks or disk arrays, one or more processors within these or other devices, or any other suitable processing device. Processing system 104 may be a stand-alone computer or may be a part of a larger network of computers associated with an entity.

Processing system 104 may include may include a processing unit 128 and a memory unit 130. Processing system 104 may be implemented using any suitable combination of hardware, firmware, and software. Processing unit 128 may include one or more microprocessors, controllers, or any other suitable computing devices or resources. Processing unit 128 may work, either alone or with other components of system 100, to provide a portion or all of the functionality of its associated processing system 104 described herein. Memory unit 130 may take the form of volatile or non-volatile memory including, without limitation, magnetic media, optical media, RAM, ROM, removable media, or any other suitable memory component.

Processing system 104 may serve as an intermediary between user system 102 and remote computer systems, such as malware analysis system 110. In certain embodiments, processing system 104 serves as an intermediary between multiple user systems 102 and remote computing systems, such as malware analysis system 110.

User system 102 may communicate with processing system 104 via one or more links 132. Links 132 facilitate wireless or wireline communication. Links 132 may communicate, for example, IP packets, Frame Relay frames, Asynchronous Transfer Mode (ATM) cells, voice, video, data, and other suitable information between network addresses. Links 132 may include one or more local area networks (LANs), radio access networks (RANs), metropolitan area networks (MANs), wide area networks (WANs), mobile networks (e.g., using WiMax (802.16), WiFi (802.11), 3G, 4G, or any other suitable wireless technologies in any suitable combination), all or a portion of the global computer network known as the Internet, and/or any other communication system or systems at one or more locations, any of which may be any suitable combination of wireless and wireline. In certain embodiments, links 132 are part of network 108, described below.

Processing system 104 may include a host monitoring coordination module 134. Host monitoring coordination module 134 may be implemented using any suitable combination of hardware, firmware, and software. Host monitoring coordination module 134 may be operable to interact with host monitoring modules 122 of user systems 102. In certain embodiments, host monitoring coordination modules 122 of user systems 102 are software agents that report (either on their own or in response to requests from host monitoring coordination module 134) to host monitoring coordination module 134.

For example, host monitoring coordination module 134 may receive an indication of events detected by host monitoring module 122 of user system 102. In other words, host monitoring module 122 of user system 102 (and in embodiments in which system 100 includes a number of user systems 102, the host monitoring modules 122 of each of the user systems 102) may report detected events to host monitoring coordination module 134, which may then determine an appropriate action and/or simply store a record of the event.

As described above, certain events detected by host monitoring module 122 may include the addition of a file 120 to user system 102. Host monitoring coordination module 134 may receive an indication of the detected addition of the file 120 to user system 102 (possibly including a copy of the file 120 and/or information associated with the detected addition of the file 120), and may determine whether it is appropriate to send the file 120 and/or information associated with the detected addition of the file 120 to malware analysis system 110 for a malware analysis to be performed on the file 120.

Processing system 104 may be coupled to or otherwise associated with a storage module 136. Storage module 136 may take the form of volatile or non-volatile memory including, without limitation, magnetic media, optical media, RAM, ROM, removable media, or any other suitable memory component. In certain embodiments, a portion of all of storage module 136 may include a database, such as one or more structured query language (SQL) servers or relational databases. Additionally or alternatively, in certain embodiments, a portion or all of storage module 136 may include non-relational storage, such as an APACHE HADOOP-based database or other object store. Storage module 136 may be a part of or distinct from a memory unit 130 of processing system 104.

Storage module 136 may store a variety of information and applications that may be used by processing system 104 or other suitable components of system 100. In the illustrated example, storage module 136 stores files 120, policies 124, and results 126, each of which are described in greater detail below. Although storage module 136 is described as including particular information and applications, storage module 136 may store any other suitable information and applications. Furthermore, although particular information and applications are described as being stored in storage module 136, the present description contemplates storing this information and these applications in any suitable location, according to particular needs.

Storage module 136 may store files 120, policies 124, and results 126. In certain embodiments these files 120, policies 124, and results 126 are substantially the same as the files 120, policies 124, and results 126 described above with respect to user system 102. For example, files 120 stored in storage module 136 may be copies of the files 120 added to user system 102. As another example, files 120 stored in storage module 136 may be pointers to instances of files 120 stored on user system 102 or some other location. As another example, files 120 stored in storage module 136 may be hashes of the actual files 120.

Policies 124 may provide rules for how to process certain events detected by host monitoring module 122 and reported to host monitoring coordination module 134. For example, policies 124 may be used by host monitoring coordination module 134 to determine whether to communicate a file 120 to malware analysis system 110 for a malware analysis to be performed on the file 120, as well as what information to provide to malware analysis system 110. These policies 124 may be the same as the policies 124 of user system 102.

In certain embodiments, policies 124 and storage module 136 may provide a second layer of filtering over the policies 124 of user system 102. For example, host monitoring module 122 of user system 102 may only be aware of files 120 which have been added to user system 102. On the other hand, host monitoring coordination module 134 may be aware of files 120 detected to be added to multiple user systems 102 (e.g., as reported by the host monitoring modules of those multiple user systems 102). A particular file 120 added to a first user system 102 may have already been communicated to malware analysis system 110 for a malware analysis to be performed on the file 120, and host monitoring coordination module 134 may be aware of that fact. Host monitoring coordination module 134 may even be aware of a result 126 of the malware analysis performed on the particular file 120 by malware analysis system 110. Thus, based on policies 124 of storage module 136, host monitoring coordination module 134 may determine not to send a matching file 120 received from a second user system 102 to remote malware analysis system 110 for a malware analysis to be performed again on the same particular file 120.

Results 126 may include the results of malware analyses performed on files 120 by malware analysis system 110. As described above, a result 126 may include one or more of the following: a result of the analysis performed by malware analysis system 110; an action to be performed by user system 102 based on a result determined by malware analysis system 110; and any other suitable information.

Files 120 and results 126 may be indexed in any suitable manner using any suitable type of identifier. As just one example, files 120 and/or results 126 may be indexed by a hash value computed by performing a hash of the file 120. In certain embodiments, rather than store a copy of file 120, host monitoring coordination module 134 may simply store a hash value computed from the file 120. For example, host monitoring module 122 of user system 102 may compute a hash value for a file 120 and communicate that hash value to host monitoring coordination module 134.

System 100 may include a web server 106. Web server 106 may be implemented using any suitable combination of hardware, firmware, and software. may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, switch, router, disks or disk arrays, one or more processors within these or other devices, or any other suitable processing device. Processing system 104 may be a stand-alone computer or may be a part of a larger network of computers associated with an entity.

Web server 106 may include may include a processing unit and a memory unit. The processing unit may include one or more microprocessors, controllers, or any other suitable computing devices or resources. The processing unit may work, either alone or with other components of system 100, to provide a portion or all of the functionality of its associated web server 106 described herein. The memory unit may take the form of volatile or non-volatile memory including, without limitation, magnetic media, optical media, RAM, ROM, removable media, or any other suitable memory component.

Web server 106 may host one or more web sites and/or one or more web services. In the illustrated example, web server 106 hosts web-based email service 138, which may be implemented using any suitable combination of hardware, firmware, and software. In general, web-based email service 138 provides a service accessible to user system 102 via a network (e.g., network 108) that hosts email functionality and potentially storage on behalf of users of user system 102. Typically, web-based email service 138 is accessed by entering a URL in an interface associated with network access application 116 of user system 102. Examples of web-based email services 136 include WINDOWS LIVE HOTMAIL operated by MICROSOFT, YAHOO! MAIL operated by YAHOO!, GMAIL operated by GOOGLE, and MOBILE ME operated by APPLE. A user of user system 102 may access web-based email by accessing a web site hosting the web-based email (e.g., HOTMAIL.COM), often providing a username and password, and accessing emails via the web site. A user of user system 102 may download emails and/or associated email attachments to user system 102. Downloading a file 120 generally includes storing an instance of the file 120 in the memory (e.g., memory unit 114) of user system 102. In certain embodiments, the host-based nature of host monitoring module 122 may allow system 100 to capture and potentially analyze for malware files 120 that may be encrypted (e.g., using SSL encryption) in transfer across network 108.

Files 120 on web server 106 may include attachments to email messages of web-based email service 138. A user may download these files 120 to user system 102. As another example, in a scenario in which web server hosts a web site in addition or as an alternative to web-based email service 138, files 120 on web server 106 may include files that may be downloaded by user system 102 from the web site.

Processing system 104 may communicate with malware analysis system 110 via communication network 108. Communication network 108 facilitates wireless or wireline communication. Communication network 108 may communicate, for example, IP packets, Frame Relay frames, Asynchronous Transfer Mode (ATM) cells, voice, video, data, and other suitable information between network addresses. Communication network 108 may include one or more LANs, RANs, MANs, WANs, mobile networks (e.g., using WiMax (802.16), WiFi (802.11), 3G, 4G, or any other suitable wireless technologies in any suitable combination), all or a portion of the global computer network known as the Internet, and/or any other communication system or systems at one or more locations, any of which may be any suitable combination of wireless and wireline.

Malware analysis system 110 may include any processing system operable to analyze one or more files 120 for malware. Malware analysis system 110 may analyze files 120 for malware in response to a request from user system 102 and/or processing system 104 (e.g., host monitoring coordination module 134). Malware analysis system 110 may return the results (e.g., as a results 126) of the analysis of the files 120 for malware to user system 102 (e.g., host monitoring module 122) and/or processing system 104 (e.g., host monitoring coordination module 134).

In certain instances, system 100 may identify a file 120 as containing malware if the file 120 includes any of a variety of forms of hostile or intrusive computer-readable logic designed to infiltrate a computer system. Particular forms of malware may include computer viruses, worms, trojan horses, spyware, adware, scareware, crimeware, rootkits, and other malicious and/or unwanted software. Malware may be designed to disrupt or deny operation of a computer system, gather information from a computer system (e.g., that leads to a loss of privacy or exploitation), gain unauthorized access to computer system resources, or engage in other abusive behavior.

Malware analysis system 110 may be operable to run one or more malware detection processes on files 120. Running the one or more malware detection processes on a file 120 may, in certain instances, result in a detection of malware. Malware detection by malware analysis system 110 may conclusively indicate that the file 120 or files 120 in question are known to contain malware. Alternatively, malware detection by malware analysis system 110 may indicate that the file 120 or files 120 in question are suspected of malware, though such detection may not conclusively indicate that the file 120 or files 120 are known to contain malware. In certain embodiments, a portion of malware analysis system 110 may generate information that is accessible by a human analyst (e.g., using analysis console 210, described in greater detail below with reference to FIGS. 2-3) for further malware analysis of one or more files 120 suspected of malware. The information may correspond to one or more files 120 subjected to a set of malware detection process run by malware analysis system 110. Malware analysis system 110 also may communicate the results of its malware analysis of files 120 as results 126.

In certain embodiments, malware analysis system 110 may publish available operations/interactions as a web service. Thus, host monitoring module 122 of user system 102 and/or host monitoring coordination module 134 of processing system 104 may communicate with malware analysis system 110 via the web service, using one or more messages formatted according to the web service interface. For example, host monitoring module 122 of user system 102 and/or host monitoring coordination module 134 of processing system 104 may communicate files 120 and/or other information associated with the detection of an addition of a file 120 to a user system 102 to malware analysis system 110 via the web service, requesting that malware analysis system 110 analyze file 120 for malware or otherwise provide a result 126.

Malware analysis system 110 may be implemented using any suitable combination of hardware, firmware, and software. For example, malware analysis system 110 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, one or more processors within these or other devices, or any other suitable processing device. Malware analysis system 110 may be a stand-alone computer or may be a part of a larger network of computers associated with an entity.

Malware analysis system 110 may comprise a processing unit 140 and a memory unit 142. Processing unit 140 may include one or more microprocessors, controllers, or any other suitable computing devices or resources. Processing unit 140 may work, either alone or with other components of system 100, to provide a portion or all of the functionality of system 100 described herein. Memory unit 142 may take the form of volatile or non-volatile memory including, without limitation, magnetic media, optical media, RAM, ROM, removable media, or any other suitable memory component. In certain embodiments, a portion of all of memory unit 142 may include a database, such as one or more SQL servers or relational databases.

Figure 2:
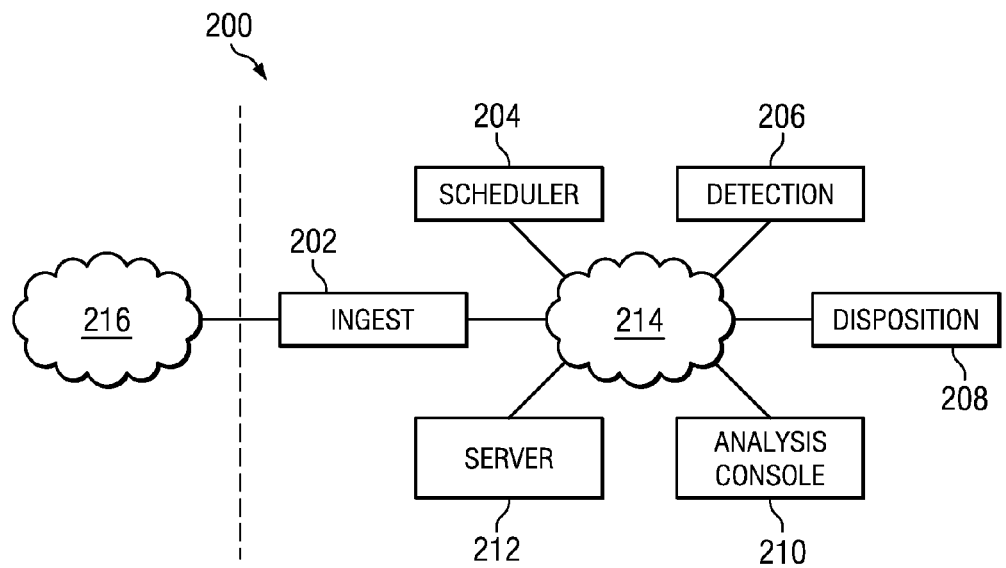
FIG. 2 illustrates an example malware analysis system, according to certain embodiments of the present disclosure.

A particular example implementation of malware analysis system 110 is illustrated in FIG. 2 and described below in greater detail. Although that particular example implementation of malware analysis system 110 is illustrated and described, the present disclosure contemplates implementing malware analysis system 110 in any suitable manner, according to particular needs.

Details regarding example operations that may be performed by system 100 are described below with respect to FIG. 4.

System 100 provides just one example of an environment in which the techniques of the present disclosure may be used. For example, although system 100 is described as including a host monitoring coordination module 134 that handles communication of files 120 and any associated information to malware analysis system 110, the present disclosure contemplates, in addition or as an alternative, user system 102 communicating files and/or associated information (e.g., via communication network 108) directly to malware analysis system 110 for analysis.

Particular embodiments of the present disclosure may provide one or more technical advantages. In certain embodiments, the present disclosure allows host-level detection of addition of a file 120 to a computer system (e.g., user system 102), as well as communication of file 120 (and other information) over a communication network 108 to remote malware analysis system 110 for a malware analysis to be performed on the file 120 by remote malware analysis system 110. This host-level monitoring may allow for desired detection of certain types of files 120, such as downloaded files, files added through web-based email, and files added from a removable medium (e.g., a flash drive). Communication of these files 120 to remote malware analysis system 110 may allow for more robust malware analysis to be performed than might be possible or practical with typical host-based or other local malware analysis systems. In certain embodiments, communication of these files 120 to remote malware analysis system 110 may be performed according to one or more policies 124, which may provide control over which files 120 are communicated to remote malware analysis system 110 and what information is communicated to remote malware analysis system 110.

FIG. 2 illustrates an example malware analysis system 200, according to certain embodiments of the present disclosure. Malware analysis system 200 provides just one example of how malware analysis system 110 (or a portion of malware analysis system 110) may be implemented. Although this particular example implementation of malware analysis system 110 is illustrated and described, the present disclosure contemplates implementing malware analysis system 110 in any suitable manner, according to particular needs. In the illustrated example, malware analysis system 200 includes ingest module 202, scheduler module 204, detection module 206, disposition module 208, analysis console 210, and server module 212.

Modules 202-212 may communicate between or among each other via one or more internal networks 214, referred to for simplicity in the singular. Internal network 214 facilitates wireless or wireline communication. Internal network 214 may communicate, for example, IP packets, Frame Relay frames, ATM cells, voice, video, data, and other suitable information between network addresses. Internal network 214 may include one or more LANs, RANs, MANs, WANs, mobile networks (e.g., using WiMax (802.16), WiFi (802.11), 3G, 4G, or any other suitable wireless technologies in any suitable combination), all or a portion of the global computer network known as the Internet, and/or any other communication system or systems at one or more locations, any of which may be any suitable combination of wireless and wireline. In certain embodiments, internal network 214 includes a system bus. Malware analysis system 200 may communicate with an external network 216, which in certain embodiments may be substantially similar to network 108 of FIG. 1.

Modules 202-212 may be implemented using any suitable combination of hardware, firmware, and software. For example, modules 202-212 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, one or more processors within these or other devices, or any other suitable processing device. Modules 202-212 may be a stand-alone computer or may be a part of a larger network of computers associated with an entity.

Modules 202-212 may include one or more processing units and one or more memory units. Each processing unit may include one or more microprocessors, controllers, or any other suitable computing devices or resources. Each processing unit may work, either alone or with other components of system 200, to provide a portion or all of the functionality of its associated computer system described herein. Each memory unit may take the form of a suitable combination of volatile and non-volatile memory including, without limitation, magnetic media, optical media, RAM, ROM, removable media, or any other suitable memory component.

In certain embodiments, the implementation and/or operation of modules 202-212 is implemented generally as follows. Ingest module 202 may access a file 120 and determine one or more tests that should be performed on file 120 to determine whether file 120 is suspected of malware. In response, detection module 206 may perform the test(s) that were determined by ingest module 202 in accordance with scheduling performed by scheduler module 204. Disposition module 208 uses the results of the tests performed by detection module 206 to determine whether the file 120 should be sent to server module 212 for quarantine purposes while a second analytical stage for file 120 is processed (e.g., at analysis console 210). Further details regarding the implementation and/or operation of modules 202-212 are described below.

Ingest module 202 may be operable to extract and cause to be analyzed file 120 accessed by malware analysis system 200. Ingest module 202 may analyze file 120 and determine one or more tests that should be performed on file 120 to determine whether file 120 is suspected of malware. In certain embodiments, ingest module 202 may be configured to determine a type of a file ingest module 202 receives. For example, ingest module 202 may examine an extension associated with the file name of file 120 to determine the type of the file. As another example, ingest module 202 may examine portions of the file content of file 120 to determine its type. Ingest module 202 may examine characters in a header of file 120 to determine its type. Such characters may be referred to as magic numbers or magic bits. In this manner, in certain embodiments, ingest module 202 may detect the correct type of file 120 even if the extension of the filename of file 120 has been removed or changed (e.g., falsified). As another example, for certain types of files 120 (e.g., MICROSOFT OFFICE files), ingest module 202 may determine the file type based on both magic number(s) and the file extension, possibly examining the magic number(s) prior to examining the file extension.

In certain embodiments, ingest module 202 may determine whether file 120 has been previously analyzed for malware. Ingest module 202 may use one or more techniques to determine if file 120 has been previously analyzed for malware. For example, ingest module 202 may generate one or more hashes of content of file 120 (such as a checksum, an MD5 hash, and/or a SHA1 hash). These value(s) may be compared to a database containing hash values of previously analyzed files 120. If the hash value is found in data storage, ingest module 202 may determine that file 120 has been previously analyzed. If the hash value is not present in data storage, ingest module 202 may determine that file 120 has not been previously analyzed. In certain embodiments, ingest module 202 may use the name of file 120 and/or its extension, as well as variations on those items, to determine if file 120 has been previously analyzed.

In certain embodiments, if it is determined that file 120 has been analyzed previously, malware detection schemes may not be applied to file 120; instead, the results of the previous analysis of file 120 may be determined using a database that contains results of a previous analysis of file 120. If the results indicate that file 120 is known not to be malware, then the analysis of file 120 may end. If it is determined that file 120 was previously determined to be malware, then it may be determined that file 120 should be quarantined. If it is determined that file 120 has been previously received and is currently being analyzed (e.g., possibly including review by human analysts associated with analysis console 210), then action may be taken once the outcome of the ongoing analysis is known. In certain embodiments, this ability to check whether a file 120 previously has been analyzed previously may allow for more efficient use of the resources that perform the malware detection schemes on the files 120 and may reduce the workload of a machine and/or human analyst.

While in this example, ingest module 202 is described as generating the information (e.g., the one or more hashes) used to determine whether file 120 has been previously analyzed, in certain embodiments, the sender of file 120 (e.g., user system 102 and/or processing system 104) may generate this information and communicate this information to malware analysis system 110 (e.g., to ingest module 202). For example, prior to or in addition to sending the actual file 120 to malware analysis system 110, the sender of file 120 may send this information to malware analysis system 110 so that malware analysis system 110 can determine whether file 120 previously has been analyzed for malware. If malware analysis system 110 determines that file 120 has not been analyzed previously for malware, then (if file 120 was not sent previously) malware analysis system 110 may request that the sender send the actual file 120 for analysis.

In certain embodiments, ingest module 202 may be used to determine whether file 120 should undergo malware detection and/or which malware detection schemes should be applied. For example, ingest module 202 may determine that a file 120 received by ingest module 210 is a plain text file. Ingest module 202 then may retrieve one or more policies associated with plain text files. A retrieved policy may indicate that plain text files are not to be analyzed for malware. As a result, the plain text file 120 may be ignored. As another example, ingest module 202 may determine that a file 120 is a document created by the MICROSOFT WORD application. Ingest module 202 may then retrieve one or more policies associated with MICROSOFT WORD documents. Ingest module 202 may examine the retrieved policy or policies and determine that the received file 120 should be analyzed for malware. Ingest module 202 may also examine the retrieved policy or policies and determine the malware detection schemes that should be applied to the MICROSOFT WORD document. Ingest module 202 then may create and store entries in data storage consistent with the determined malware detection schemes.

Scheduler module 204, in certain embodiments, may determine the order in which malware detection processes are performed. Scheduler module 204 may assign processes to various computing resources of malware analysis system 200 using any suitable method. For example, scheduler module 204 may use a first-in-first-out (FIFO) algorithm to assign processes. Processes may also be prioritized. For example, scheduler module 204 may use a FIFO approach to schedule jobs initially, but it may be determined to prioritize one job over another in response to results provided by the detection nodes. Schedule policies may be used by scheduler module 204 to determine how to schedule jobs and how to prioritize jobs. Priorities for jobs, in certain embodiments, may also be determined based on the context associated with the file 120. For example, if the file 120 undergoing analysis was part of an e-mail attachment, it may be prioritized higher than other files 120.

In certain embodiments, policies used by scheduler module 204 may be modified when a new malware detection scheme is added. Information may be entered regarding how to apply the malware detection scheme. For example, such information may be entered using a tabbed interface, a wizard-style interface, or other interfaces for entering information. The information entered may include how jobs should be prioritized, the context associated with file 120, which malware detection nodes 102 are involved in implementing the malware detection scheme, and/or other items associated with applying a malware detection scheme.

Detection module 206, in certain embodiments, may be operable to perform the test(s) that were determined by ingest module 202 in accordance with scheduling performed by scheduler module 204. In certain embodiments, detection module 206 may conform to an interface standard for applying malware detection. Such an interface may include standards for one or more of the following: specifying file 120 (including, possibly, a URL) that is to be analyzed configuration parameters for applying the detection scheme, time limit for completing the analysis, format of results, specifying the reason for indicating that an analyzed item is suspect, providing log files, and other suitable items involved with applying malware detection schemes.

In certain embodiments, having such an interface may be advantageous because it may allow policies to call for the application of malware detection schemes without having to give precise parameters based on the configuration of the detection node. In this manner, in certain embodiments, new detection schemes may be added to the system without needing to recode various parts of the system since the detection node applying the new malware detection scheme would conform to the interface standard. For example, to add a new malware detection scheme, the detection node applying the new malware detection seem may be configured to conform to the interface standard by being configured to receive files 120 for analysis in the same or similar manner as other configuration nodes applying other malware detection schemes. In addition, for example, the configuration node applying the new malware detection scheme may be configured to report the results of applying the new malware detection scheme in the same or similar manner as other configuration nodes applying other malware detection schemes. This may allow malware analysis system 200 to adapt to new malware detection schemes.

Detection module 206 may be implemented on a variety of types of hardware. For example, detection module 206 may be configured in a blade architecture or on physical hosts. Detection module 206 may be configured utilizing clusters or other suitable distributed computing architectures. Detection module 206 may use virtualization and/or may include virtual machines. Detection module 206 may be used to apply a variety of malware detection schemes to a file 120 (which, in certain embodiments, may include one or more URLs). In certain embodiments, detection module 206 may be specialized such that malware analysis system 200 may be configured to apply a type of malware detection scheme. For example, detection module 206 may be configured to apply behavior-based malware detection schemes and/or metadata-based detection schemes when metadata of file 120 is analyzed. In yet another example, detection module 206 may be configured to apply signature-based detection schemes to files 120. As another example, detection module 206 may also apply classification-based detection schemes. As described above, detection module 206 may be configured to apply other forms of detection schemes that conform to an interface to facilitate the incorporation of new or different detection schemes.

Disposition module 208, in certain embodiments, may be operable to use the results of the tests performed by detection module 206 to determine what should be done with the file(s) 120. In some cases, disposition module 208 may characterize the file 120 as being suspected of malware. In response, malware analysis system 200 may send information corresponding to the file(s) 120 and/or actual content of the file(s) 120 (e.g., the file 120 itself) for further review at analysis console 210. In certain embodiments, disposition module 208 may respond to the results of detection module 206 regardless of whether it sends the file(s) 120 to analysis console 210. For example, disposition module 208 may determine that the file(s) 120 should be quarantined and send the file 120 to server module 212 to quarantine the file 120. In certain embodiments, disposition module 208 may determine that the file(s) 120 are not malware and may perform suitable corresponding actions. For example, disposition module 208 may indicate that it would be appropriate to release for delivery a message to which the analyzed file(s) 120 were attached, in response to the determination by disposition module 208 that the file(s) 120 are not malware.

Analysis console 210, in certain embodiments, is operable to facilitate malware analysis for files 120 that have been identified (e.g., by disposition module 208 or another suitable component of malware analysis system 200) as requiring further malware analysis. In certain embodiments, analysis console 210 may be operable to access information generated by disposition module 208 or another suitable component of malware analysis system 200, and to facilitate the propagation of a final disposition, if appropriate. The information propagated (e.g., for communication to another suitable component of malware analysis system 200 and/or to user system 102) may include malware analysis outputs generated by analysis console 210, such that the recipient may benefit from the results of malware analysis performed using analysis console 210. Additional details of an example analysis console 210 are described below with respect to FIG. 3.

Server module 212 may include, for example, a file server, a domain name server, a proxy server, a web server, a computer workstation, or any other tangible device and associated logic operable to communicate with modules 230, 240, 250, 260, and/or 280 through network 220. Server module 212 may execute with any of the well-known MS-DOS, PC-DOS, OS-2, MAC-OS, WINDOWS™, UNIX, or other appropriate operating systems, including future operating systems. In certain embodiments, server module 212 may include one or more of the following in any suitable combination: a processor, data storage, a network interface, input functionality, and output functionality.

Figure 3:
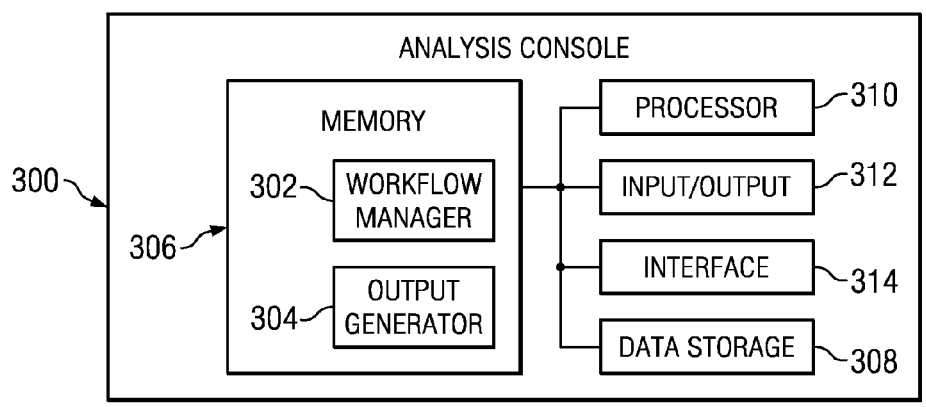
FIG. 3 illustrates one embodiment of an analysis console, according to certain embodiments of the present disclosure.

FIG. 3 illustrates one embodiment of an analysis console 300, according to certain embodiments of the present disclosure. In certain embodiments, analysis console 300 provides one example implementation of analysis console 210 of FIG. 2. As shown in FIG. 3, analysis console 300 includes a workflow manager 302 and an output generator 304 stored in computer-readable memory 306, data storage 308, processor 310, input/output functionality 312, and an interface 314. Workflow manager 302, output generator 304, memory 306, data storage 308, processor 310, input/output functionality 312, and interface 314 may be implemented using any suitable respective combination of hardware, firmware, or software. In certain embodiments, workflow manager 302, output generator 304, memory 306, data storage 308, processor 310, input/output functionality 312, and/or interface 314 may be capable of executing logic accessible to these components and/or stored therein. Although this embodiment includes workflow manager 302, output generator 304, memory 306, data storage 308, processor 310, input/output functionality 312, and interface 314, other embodiments may exclude one or more of these components without departing from the scope of the present disclosure.

In certain embodiments, workflow manager 302 may determine a workflow. A workflow is an ordered list of one or more tasks related to malware analysis. Execution of a workflow starts with a task in the list. Upon completion of a task, the active task calls the subsequent task in the ordered list using, for example, a defined API. When the final task of the workflow finishes, the workflow is complete. Certain workflows may facilitate malware analysis by a human analyst and/or by various analysis modules of analysis console 300. The information analyzed may correspond to a file 120 and/or may include actual content of the file 120.

In certain instances, the information to be analyzed may be presented to a human analyst for review based on a prior characterization of the file 120. For example, if malware analysis system 200 characterizes the file 120 as being suspected of malware, then a human analyst may review the file 120 to determine if it is in fact malware. As another example, if the file 120 is determined to be malware rather than merely to be suspected malware, a human analyst may review the file 120 to learn more about the malware in the file 120 and/or to start an incident response review (e.g., to clean up the file 120).

In such and other scenarios, workflow manager 302 may determine a workflow associated with reviewing the file 120. In certain embodiments, workflow manager 302 may generate a set of tasks to be performed by a human analyst reviewing the file 120 based on a variety of factors. Such factors could include the type of file 120 being reviewed and the characterization of the file 120 by malware analysis system 200. Other factors may include whether the system is operating in a passive, active, a hybrid passive/active mode, or another mode. For example, if operating in an active mode, a determination that the file 120 is suspected malware may invoke an advanced malware analysis workflow to be followed by a human analyst. As another example, if the file 120 is determined to be known malware, then workflows associated with cleaning up the environment(s) the file 120 has been in as well as other incident response workflows (e.g., notifying a user or an administrator) may be determined. Other suitable workflows may be generated based on these or other suitable factors.

In certain embodiments, workflow manager 302 may, automatically perform certain tasks to facilitate the review of the file 120 by the human analyst. For example, it may be determined that for a file 120 to be properly reviewed by a human analyst, all strings in the file 120 should be extracted. Workflow manager 302 may automate this extraction procedure. Workflow manager 302 may also provide a priority associated with the review of the file 120. For example, if it is determined that a file 120 has a higher probability of containing malware, then a higher priority may be assigned to the review of the file 120. Workflow manager 302 may also provide a display that enables the human analyst to review the workflow, the file 120 being analyzed, and/or information pertaining to that file 120.

Output generator 304, in certain embodiments, may be operable to generate a malware analysis output (a portion or all of which may be or may be included with response 126). In certain embodiments, the output may include an identifier of the file 120 or files 120 analyzed. For example, an identifier might include a hash of all or a portion of a file 120 analyzed at analysis console 300. The hash may be at least substantially equivalent to a hash generated by the ingest module 202 of the node 200 requesting the file 120 to be further analyzed for malware. Certain outputs generated by output generator 304 may include an indication of whether the file 120 (or files 120) analyzed at output generator 304 contain malware.

Memory 306 and data storage 308 may take the form of a suitable combination of volatile and non-volatile memory including, without limitation, magnetic media, optical media, RAM, ROM, removable media, or any other suitable memory component. Additionally, all or part of memory 306 and/or data storage 308 could reside locally within analysis console 300 or could reside at a location external but accessible to analysis console 300. Additionally, portions or all of memory 306 and data storage 308 may be combined, if appropriate.

Processor 310 may include one or more microprocessors, controllers, or any other suitable computing devices or resources. Each processor may work, either alone or with other components of analysis console 300, to provide a portion or all of the functionality of its associated computer system described herein. In certain embodiments, processor 310 may comprise the primary element or elements executing or realizing various logic-based functions, including, for example, the functions of workflow manager 302 and an output generator 304.

I/O functionality 312 may comprise, for example, any communication method of analysis console 300 (e.g., from an image buffer to a display). In certain embodiments, input functionality may comprise, for example, the receiving signals or data by analysis console 300. In other embodiments, output functionality may comprise, for example, the communication of signals or data by analysis console. These terms may also refer to part of an action, such as, for example, to "perform I/O" may involve performing an input and/or output operation. In some cases, one or more communication devices of analysis console 300 may be used to implement both input and output functionality.

Interface 314 may comprise, for example, any tangible device(s) that may be used (e.g., by a person, or by another device or system) to communicate with analysis console 300. For example, keyboards and mice may be considered input interfaces 314 of some analysis consoles 300, while monitors and printers may be considered output interfaces of some analysis consoles 300.

Figure 4:
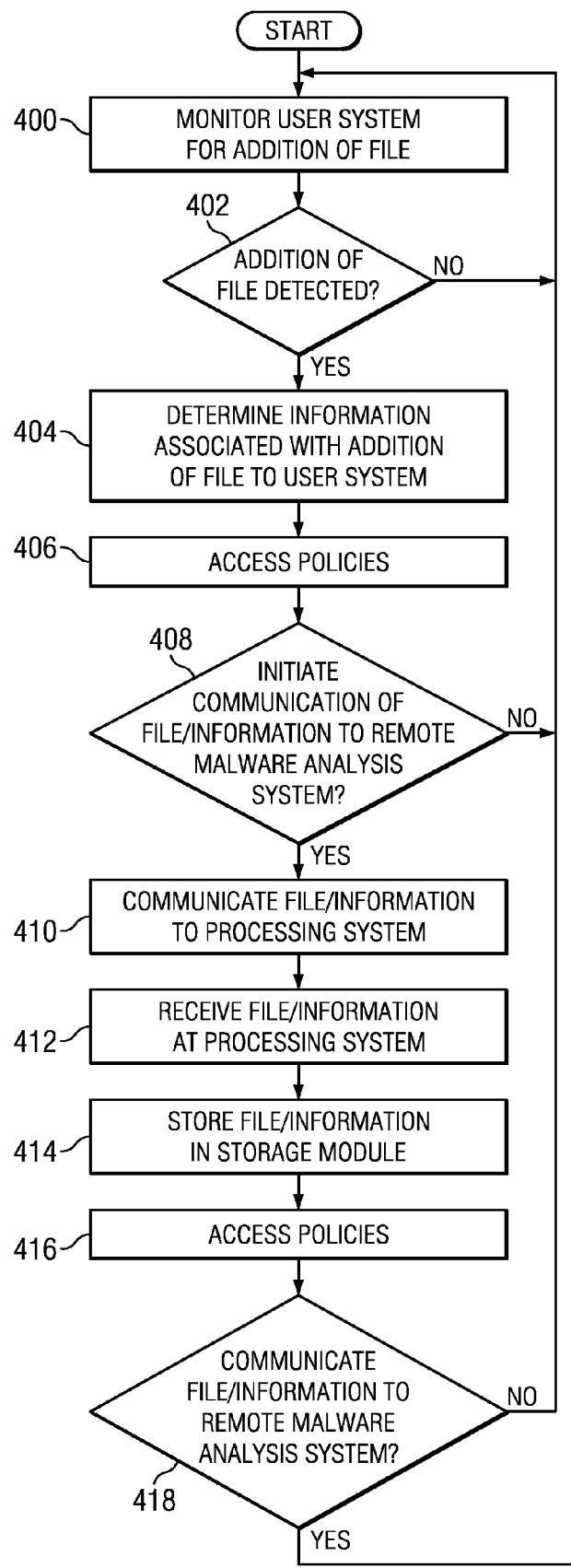
FIG. 4 illustrates an example method for detecting addition of a file to a computer system and initiating remote analysis of the file for malware, according to certain embodiments of the present disclosure.
Figure 4:
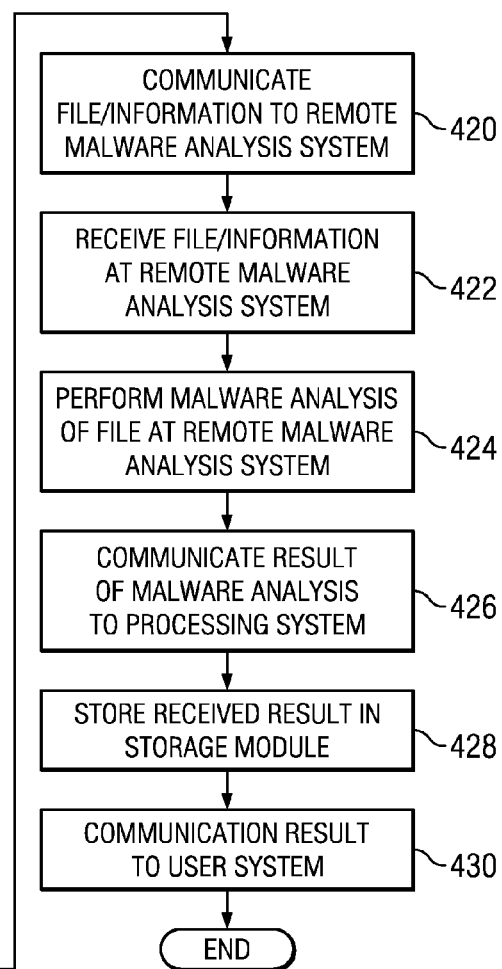

FIG. 4 illustrates an example method for detecting addition of a file 120 to a computer system and initiating remote analysis of the file 120 for malware, according to certain embodiments of the present disclosure. The methods described with respect to FIG. 4 may be implemented in any suitable combination of software, firmware, and hardware. This example method is described with respect to system 100 of FIG. 1; however, the present disclosure contemplates this example method being performed using any suitable type of system according to particular needs. Additionally, although particular components of system 100 are described as performing particular steps of the following method, the present disclosure contemplates any suitable component performing these steps according to particular needs. In this particular example, the computer system being monitored for addition of a file 120 is user system 102.

At step 400, host monitoring module 122 of user system 102 monitors user system 102 for addition of a file 120 to user system 102. For example, host monitoring module 122 may monitor user system 102 for addition of a file 120 from removable media storage device 118 to user system 102. As another example, host monitoring module 122 may monitor user system 102 for addition of a file 120 to user system 102 via a network connection. As another example, host monitoring module 122 may monitor user system 102 for addition of a file 120 from a web-based electronic mail service to user system 102. As a particular example, the file 120 may be an attachment to an email accessed by user system 102 using the web-based electronic mail service. In certain embodiments, monitoring user system 102 for addition of a file 120 to user system 102 may include one or more of monitoring user system 102 for an actual addition of a file 120 to user system 102 and monitoring user system 102 for an attempt (e.g., by a user of user system 102 and/or by an application of user system 102) to add a file 120 to user system 102. In certain embodiments, host monitoring module 122 substantially continuously monitors user system 102 for addition of a file 120 to user system 102. Although detection of the addition of a file 120 added by particular techniques is described, the present disclosure contemplates detection of the addition of a file 120 added in any suitable manner, according to particular needs.

At step 402, host monitoring module 122 may determine whether the addition of a file 120 has been detected. For example, host monitoring module 122 may determine whether the addition of a file 120 from removable media storage device 118 to user system 102 has been detected. As another example, host monitoring module 122 may determine whether the transfer of a file 120 to user system 102 via a network connection has been detected. As another example, host monitoring module 122 may determine whether the transfer of a file 120 from web-based electronic mail service 138 to user system 102 has been detected. In certain embodiments, detecting an addition of a file 120 to user system 102 may include one or more of detecting an actual addition of a file 120 to user system 102 and detecting an attempt (e.g., by a user of user system 102 and/or by an application of user system 102) to add a file 120 to user system 102.

If at step 402 host monitoring module 122 does not detect an addition of a file 120 to user system 102, then the method may return to step 400 for host monitoring module 122 to continue to monitor user system 102 for addition of a file 120 to user system 102. If at step 402 host monitoring module 122 detects the addition of a file 120 to user system 102, then the method may proceed to step 404.

At step 404, host monitoring module 122 may determine information associated with the addition of file 120 to user system 102. The information may include one or more of a hash of the file 120, a timestamp associated with the addition of the file 120 to user system 102, a mechanism by which the file 120 was added to user system 102, and any other suitable information.

At step 406, host monitoring module 122 may access policies 124. For example, host monitoring module 122 may access policies 124 to determine whether to initiate communication of the file 120 to remote malware analysis system 110. Initiating communication of file 120 to remote malware analysis system 110 may include communicating file 120 and/or any other suitable information associated with the addition of file 120 to user system 102 directly from user system 102 to remote malware analysis system 110.

In certain other embodiments, initiating communication of file 120 to remote malware analysis system 110 may include communicating file 120 and/or any other suitable information associated with the addition of file 120 to user system 102 to processing system 104, which may be responsible for communicating the file 120 and/or other suitable information to malware analysis system 110. For purposes of this example method, the present disclosure assumes that communication of file 120 and/or other suitable information from user system 102 to malware analysis system 110 or from malware analysis system 110 to user system 102 passes through processing system 104 prior to being sent to malware analysis system 110 or received from malware analysis system 110, respectively.

Policies 124 may specify when to initiate communication of files 120 to malware analysis system 110 and what information should be sent to malware analysis system 110. As just one example, policies 124 may specify which types of files 120 should be communicated to malware analysis system 110.

At step 408, host monitoring module 122 may determine whether to initiate communication of file 120 and/or other suitable information to malware analysis system 110. If at step 408 host monitoring module 122 determines not to initiate communication of file 120 and/or other suitable information to malware analysis system 110, then the method may return to step 400 for host monitoring module 122 to monitor user system 102 for addition of a file 120 to user system 102. If at step 408 host monitoring module 122 determines to initiate communication of file 120 and/or other information to malware analysis system 110, the method may proceed to step 410.

At step 410, host monitoring module 122 of user system 102 may communicate file 120 and/or other suitable information to processing system 104. For example, host monitoring module 122 may communicate a copy of file 120 to processing system 104. Additionally or alternatively, host monitoring module 122 may communicate other suitable information to processing system 104. This other information may include an identifier for user system 102 (e.g., an IP address, a user name, a machine identification number, and/or any other suitable identifying information), a hash value computed from file 120, timestamp information associated with the addition of file 120 to user system 102 (and/or any other suitable time information), an identification of a manner in which file 120 was added to user system 102, an identification of one or more policies (e.g., one or more polices 124) that resulted in file 120 being communicated to processing system 104 (and/or malware analysis system 110), and any other suitable information.

At step 412, host monitoring coordination module 134 of processing system 104 may receive file 120 and/or the other information communicated by host monitoring module 122 of user system 102. At step 414, host monitoring coordination module 134 of processing system 104 may store a copy of any suitable portion of the received information (including potentially a copy of file 120) in storage module 136.

At step 416, host monitoring coordination module 134 may access policies 124 stored in storage module 136 to determine whether to communicate file 120 and/or other suitable information to malware analysis system 110 for a malware analysis of file 120 to be performed. As described above, policies 124 of storage module 136 may be the same as or different than the policies 124 accessed by host monitoring module 122.

At step 418, host monitoring coordination module 134 may determine whether to communicate file 120 and/or other suitable information to remote malware analysis system 110 for a malware analysis to be performed on file 120. If host monitoring coordination module 134 determines at step 418 not to communicate file 120 and/or associated information to malware analysis system 110, then host monitoring coordination module 134 may continue to await additional communications from host monitoring module 122 of user system 102 (and, potentially, multiple user systems 102) and the method may return to step 400. For example, host monitoring coordination module 134 may determine that another instance of file 120 has already been communicated to (and potentially already analyzed by) malware analysis system 110. If host monitoring coordination module 134 determines that a result 126 for file 120 is already stored in storage module 136, then host monitoring coordination module 134 may communicate that result 126 to user system 102, if appropriate, and/or take any other suitable action.

In certain embodiments, if host monitoring coordination module 134 detects that it is receiving a large number of requests for a malware analysis of a particular file 120, host monitoring coordination module 134 may communicate the results of the malware analysis (if known) for the particular file 120 to all or a particular subset of user systems 102 to reduce the processing burden on processing system 104. For example, host monitoring coordination module 134 may maintain a list of hashes (or other identifier(s)) of files 120 for which malware analysis requests have been made by user systems 102. If requests for a malware analysis for a particular file 120 exceed some predetermined threshold, host monitoring coordination module 134 may push the results of the malware analysis (if known) for that file 120 to the various user systems 102 (e.g., to host monitoring module 122). The host monitoring module 122 of user systems 102 may check a local (to user system 102) list of files 120 (e.g., hashes or other identifiers of file(s) 120) for which malware analysis results are known before sending a request for a malware analysis of a particular file 120. The local list also may include an indication of whether the file 120 is malware. In certain embodiments, this may be particularly useful for files 120 that are known not to be malware ("known good" files).

Returning to step 418, if host monitoring coordination module 134 determines at step 418 to communicate file 120 and/or other associated information to malware analysis system 110, then at step 420 host monitoring coordination module 134 may communicate file 120 and/or other associated information to malware analysis system 110 for a malware analysis to be performed on file 120. In certain embodiments, malware analysis system 110 is implemented as a web service, and its functions are exposed using a web service interface. Host monitoring coordination module 134 may invoke the web service provided by malware analysis system 110, and may interact with malware analysis system 110 according to the interface specification for malware analysis system 110. This interface may be implemented in any suitable manner according to particular needs.

As just one example, the web service interface of malware analysis system 110 may specify that host monitoring coordination module 134 provide the hash of file 120 to malware analysis system 110 prior to sending the actual file 120 to malware analysis system 110, so that malware analysis system 110 may determine whether an analysis has already been performed (or is already in the process of being performed) on file 120. If malware analysis system 110 determines based on the hash value that a malware analysis has already been performed (or is in progress) on file 120, then malware analysis system 110 may instruct host monitoring coordination module 134 not to communicate file 120 to malware analysis system 110.

In certain embodiments, even in cases for which malware analysis system 110 has analyzed previously (or is currently analyzing) a particular file 120 for malware, malware analysis system 110 may keep track of subsequent requests to analyze that particular file 120. This may allow malware analysis system 110 to have further insight into the pervasiveness of a particular file 120, to determine whether particular requests are bad requests, and to take any suitable actions based on this additional information.

Additionally or alternatively, in certain embodiments, in a substantially similar manner to that described above with reference to host monitoring module 134, if malware analysis system 110 detects that it is receiving a large number of requests for a malware analysis of a particular file 120, malware analysis system 110 may communicate the results of the malware analysis (if known) for the particular file 120 to all or a subset of processing systems 104 and/or to all or a particular subset of user systems 102 to reduce the processing burden on malware analysis system 110 and/or processing system(s) 104. For example, malware analysis system 110 may maintain a list of hashes (or other identifier(s)) of files 120 for which malware analysis requests have been made (e.g., by user systems 102 and/or processing systems 104. If requests for a malware analysis for a particular file 120 exceed some predetermined threshold, malware analysis system 110 may push the results of the malware analysis (if known) for that file 120 to the various user systems 102 (e.g., to host monitoring module 122) and/or to various processing systems 104. The host monitoring module 122 of user systems 102 may check a local (to user system 102) list of files 120 (e.g., hashes or other identifiers of file(s) 120) for which malware analysis results are known before sending a request for a malware analysis of a particular file 120. Additionally or alternatively, The host monitoring coordination module 122 of processing systems 104 may check a local (to processing system 104) list of files 120 (e.g., hashes or other identifiers of file(s) 120) for which malware analysis results are known before sending a request for a malware analysis of a particular file 120. The local list also may include an indication of whether the file 120 is malware. In certain embodiments, this may be particularly useful for files 120 that are known not to be malware ("known good" files).

If malware analysis system 110 determines that a malware analysis of file 120 has not been performed (and is not in progress), then malware analysis system 110 may instruct host monitoring coordination module 134 to provide a copy of file 120 to malware analysis system 110 for malware analysis. In certain other embodiments, the web service interface provided by malware analysis system 110 may allow host monitoring coordination module 134 to provide file 120 for analysis at any suitable time.

At step 422, malware analysis system 110 may receive the file 120 and/or other suitable information from host monitoring coordination module 134. At step 424, malware analysis system 110 may perform a malware analysis of file 120. The present disclosure contemplates malware analysis system 110 performing this malware analysis in any suitable manner according to particular needs. A particular example implementation of malware analysis system 110 is described above with reference to FIGS. 2-3.

In certain embodiments, prior to malware analysis system 110 performing a malware analysis of file 120, malware analysis system 110 (or another suitable component of system 100) may determine whether malware analysis system 110 has previously analyzed file 120 for malware. For example, malware analysis system 110 may compare a hash or other identifier of the file 120 included in the request with one or more stored hashes or other identifiers of files 120 that have been previously (or currently are being) analyzed for malware by malware analysis system 110. In certain embodiments, if it is determined that file 120 has been analyzed previously, malware detection schemes may not be applied to file 120; instead, the results of the previous analysis of file 120 may be determined using a database that contains results of a previous analysis of file 120. If appropriate, those results may be returned to the requesting system (e.g., processing system 104 and/or user system 102). For example, the method may skip step 424 and proceed to step 426. In certain embodiments, if it is determined that file 120 has not been analyzed previously, the method may proceed to step 424.

As described above, in certain embodiments, malware analysis system 110 may publish available operations/interactions as a web service, and processing system 104 and/or user system 102 may submit requests for a malware analysis to be performed using the web service. In certain examples of such embodiments, the web services logic may be responsible for determining whether the file 120 has been previously analyzed for malware and if so, returning a previous result to the requesting system (e.g., processing system 104 and/or user system 102).

Example techniques for determining whether malware analysis system 110 has previously analyzed file 120 for malware are described above with reference to FIG. 2 (e.g., in associated with ingest module 202 of malware analysis system 200.

At step 426, malware analysis system 110 may communicate a result 126 to host monitoring coordination module 134. Result 126 may include a disposition resulting from the malware analysis performed on file 120, a recommended action, and/or any other suitable information. For example, a result 126 may conclusively indicate that the file 120 is known to contain malware, that the file 120 is suspected of malware (though such detection may not conclusively indicate that file 120 is known to contain malware), that file 120 is not malware, and/or any other suitable result of the malware analysis performed by malware analysis system 110.

At step 428, host monitoring coordination module 134 may store the received result 126 in storage module 136. For example, host monitoring coordination module 134 may store result 126 for file 120 indexed by the hash value for file 120. At step 430, host monitoring coordination module 134 may communicate the result 126 to host monitoring module 122 of user system 102, if appropriate. In certain embodiments, a result may not be communicated to user system 102. For example, in certain embodiments if the result of analyzing a particular file 120 for malware results in a determination that the file is suspected of being malware, the particular file 120 may be sent to analysis console 210 for analysis and a result may not be sent to user system 102 (e.g., or may be delayed).

Although the method in FIG. 4 is illustrated as ending after step 430, it will be understood that the method may be performed substantially continuously (or at any other suitable interval) as user system 102 continues to monitor for addition of files 120 and as those files 120 or other related information is processed by system 100.

Figure 5:
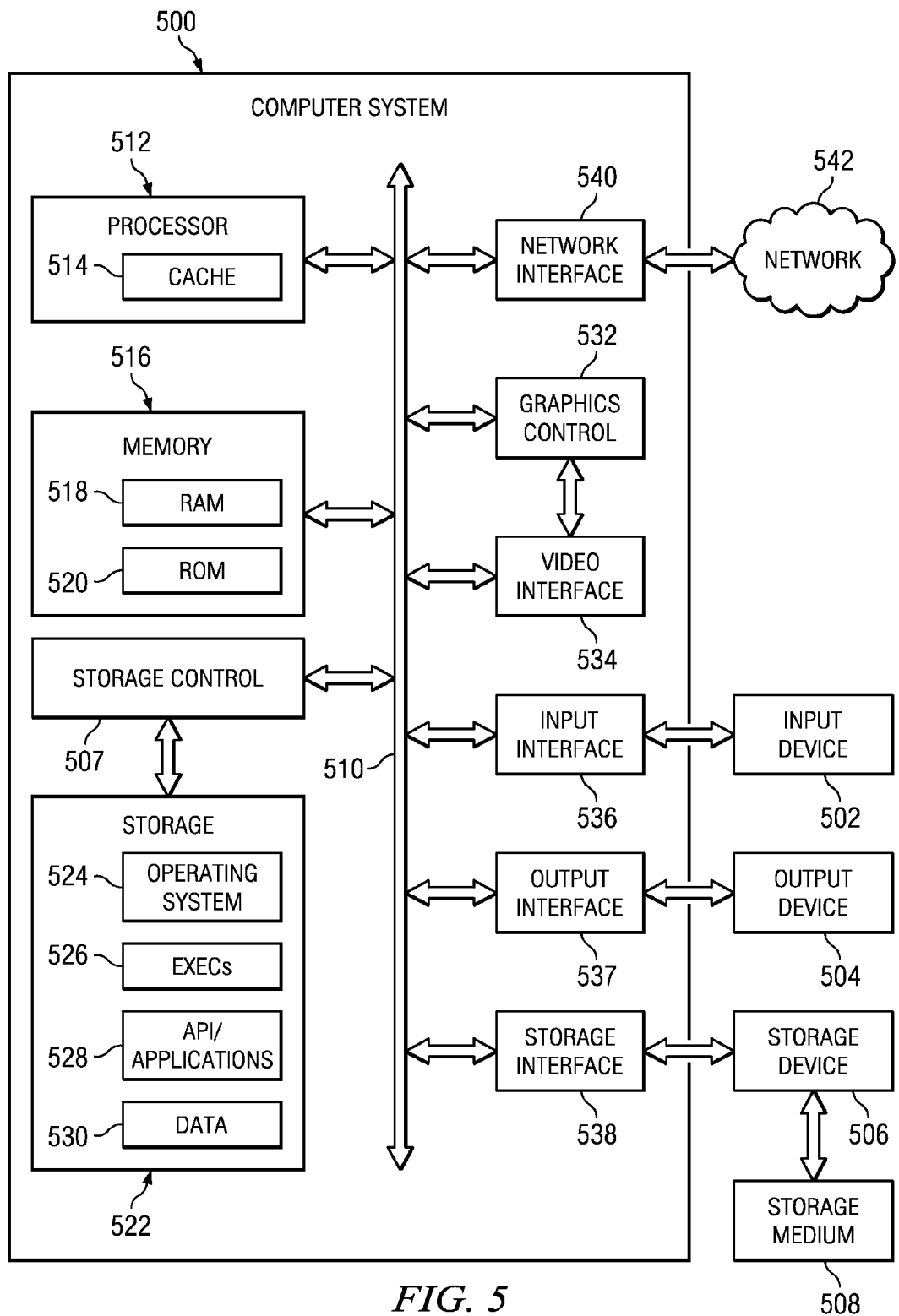
FIG. 5 illustrates an example computer system that may be used for one or more portions of the systems described with references to FIGS. 1-4, according to certain embodiments of the present disclosure.

FIG. 5 illustrates an example computer system 500 that may be used for one or more portions of the systems described with references to FIGS. 1-4, according to certain embodiments of the present disclosure. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, one or more supercomputers, one or more servers, and one or more distributed computing elements. Portions or all of system 100 may be implemented using all of the components, or any appropriate combination of the components, of computer system 500 described below.

Computer system 500 may have one or more input devices 502 (which may include a keypad, keyboard, mouse, stylus, or other input devices), one or more output devices 504 (which may include one or more displays, one or more speakers, one or more printers, or other output devices), one or more storage devices 506, and one or more storage media 508. An input device 502 may be external or internal to computer system 500. An output device 504 may be external or internal to computer system 500. A storage device 506 may be external or internal to computer system 500. A storage medium 508 may be external or internal to computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-E), and Accelerated Graphics Port (AGP) bus.

Computer system 500 includes one or more processors 512 (or central processing units (CPUs)). A processor 512 may contain a cache 514 for temporary local storage of instructions, data, or computer addresses. Processors 512 are coupled to one or more storage devices, including memory 516. Memory 516 may include RAM 518 and ROM 520. Data and instructions may transfer bi-directionally between processors 512 and RAM 518. Data and instructions may transfer uni-directionally to processors 512 from ROM 520. RAM 518 and ROM 520 may include any suitable computer-readable storage media.

Computer system 500 includes fixed storage 522 coupled bi-directionally to processors 512. Fixed storage 522 may be coupled to processors 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In certain embodiments, fixed storage 522 may include network resources, such as one or more storage area networks (SAN) or network-attached storage (NAS).

Processors 512 may be coupled to a variety of interfaces, such as, for example, graphics control 532, video interface 534, input interface 536, output interface 537, and storage interface 538, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processors 512 to another computer system or to network 542. Network interface 540 may include wired, wireless, or any combination of wired and wireless components. Such components may include wired network cards, wireless network cards, radios, antennas, cables, or any other appropriate components. With network interface 540, processors 512 may receive or send information from or to network 542 in the course of performing steps of certain embodiments. Certain embodiments may execute solely on processors 512. Certain embodiments may execute on processors 512 and on one or more remote processors operating together.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processors 512 may access an incoming or outgoing packet in memory 516 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, compact discs (CDs) (such as CD-ROMs), field-programmable gate arrays (FPGAs), floppy disks, optical disks, hard disks, holographic storage devices, integrated circuits (ICs) (such as application-specific ICs (ASICs)), magnetic tape, caches, programmable logic devices (PLDs), RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 516 may include one or more tangible, computer-readable storage media embodying software and computer system 500 may provide particular functionality described or illustrated herein as a result of processors 512 executing the software. Memory 516 may store and processors 512 may execute the software. Memory 516 may read the software from the computer-readable storage media in mass storage device 516 embodying the software or from one or more other sources via network interface 540. When executing the software, processors 512 may perform one or more steps of one or more processes described or illustrated herein, which may include defining one or more data structures for storage in memory 516 and modifying one or more of the data structures as directed by one or more portions the software, according to particular needs.

In certain embodiments, the described processing and memory elements (such as processors 512 and memory 516) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A computer system, comprising:
a host user system comprising:
a first memory; and
a first processor operable to monitor the host user system, the first processor further arranged to:
monitor the host user system for addition of a file to the host user system;
detect the addition of a file to the host user system;
access one or more policies to determine whether to communicate information associated with the detected addition of the file over a communication network to initiate a possible malware analysis of the file;
initiate, in response to determining to communicate the information associated with the detected addition of the file over the communication network, a communication over the communication network of the information associated with the detected addition of the file to an intermediary; and
the intermediary, disposed separate to the host user system, the intermediary, comprising:
a second memory; and
a second processor arranged:
to coordinate monitoring the host user system and the malware analysis and to receive the information associated with the detected addition of the file at the host user system prior to forwarding the information to a remote malware analysis system;
the intermediary further arranged to access the one or more policies to determine whether to communicate, over the communication network, the information associated with the detected addition of the file received from the host user system to the remote malware analysis system to initiate the malware analysis of the file by the remote malware analysis system and to determine, based on the one or more policies, what information associated with the detected addition of the file to communicate over the communication network to the remote malware analysis system;
wherein the information comprises one or more of the following:
identification information for the host user system;
identification of a manner in which the file was attempted to be added to the host user system; and
timestamp information.

2. The computer system of claim 1, wherein:
the first processor monitors the host user system for the addition of the file to the host user system by monitoring the host user system for from a removable media storage device to the host user system and monitors the addition of the file to the host user system by detecting the addition of the file from the removable media storage device to the host user system.

3. The computer system of claim 2, wherein the removable media storage device comprises one or more of:
a flash storage device;
a optical media storage device; and
a magnetic media storage device.

4. The computer system of claim 1, wherein:
the first processor monitors the host user system for the addition of the file to the host user system by monitoring the user system for the addition of the file to the host user system via a network connection and detects the addition of the file to the host user system by detecting a transfer to the host user system of the file via the network connection.

5. The computer system of claim 1, wherein:
the first processor monitors the host user system for the addition of the file to the host user system comprises monitoring the host user system for the addition of the file from a web-based electronic mail service to the host user system and detects the addition of the file to the host user system by detecting a transfer of the file from the web-based electronic mail service to the host user system.

6. The computer system of claim 5, wherein the web-based electronic mail service comprises one or more of:
WINDOWS LIVE™ HOTMAIL® service;
YAHOO! MAIL service;
GMAIL™ service; and
MOBILEME® service.

7. The computer system of claim 5, wherein:
the file comprises an attachment to an email accessed using the web-based electronic mail service;
the first processor monitoring the host user system for the addition of the file from a web-based electronic mail service to the host user system by monitoring the host user system for a download of the attachment from the web-based electronic mail service to the host user system and detecting the addition of the file from the web-based electronic mail service to the host user system by detecting the transfer of the attachment from the web-based electronic mail service to the host user system.

8. The computer system of claim 1, wherein the first processor is operable to initiate communication over the communication network of the information associated with the detected addition of the file by invoking a web service call to the remote malware analysis system.

9. A non-transitory computer-readable medium comprising instructions that when executed by one or more processors operable to perform operations comprising:
monitoring, by a first processor of a host user system, a user system for addition of a file to the user system;

detecting, by the first processor of the host user system, the addition of the file to the user system;

accessing, by the first processor of the host user system, one or more policies to determine whether to communicate information associated with the detected addition of the file over a communication network to an intermediary to initiate a possible malware analysis of the file by the intermediary;

initiating by the processor of the intermediary, in response to determining to communicate the information associated with the detected addition of the file over the communication network to the intermediary, a communication over the communication network of the information associated with the detected addition of the file to the intermediary;

coordinating, by the processor of the intermediary, monitoring the user system and the malware analysis and receiving, by the second processor, the information associated with the detected addition of the file at the user system prior to being forwarded to a remote malware analysis system;

accessing the one or more policies by the processor of the intermediary to determine whether to communicate, over the communication network, the information associated with the detected addition of the file received from the host user system to the remote malware analysis system to initiate the malware analysis of the file by the remote malware analysis system; and determining by the processor of the intermediary, based on the one or more policies, what information associated with the detected addition of the file to communicate over the communication network to the remote malware analysis system;

wherein the information comprises one or more of the following:
identification information for the host user system;
identification of a manner in which the file was attempted to be added to the host user system; and
timestamp information.

10. The non-transitory computer-readable medium of claim 9, wherein:
the processor of the host user system monitors the host user system for the addition of the file to the host user system by monitoring the host user system for the addition of the file from a removable media storage device to the host user system and monitors an the addition of the file to the host user system by detecting an the addition of the file from the removable media storage device to the host user system.

11. The non-transitory computer-readable medium of claim 10, wherein the removable media storage device comprises one or more of:
a flash storage device;
a optical media storage device; and
a magnetic media storage device.

12. The non-transitory computer-readable medium of claim 9, wherein:
the processor of the host user system monitors the host user system for the addition of the file to the host user system by monitoring the user system for the addition of the file to the host user system via a network connection and detects the addition of the file to the host user system by detecting a transfer to the host user system of the file via the network connection.

13. The non-transitory computer-readable medium of claim 9, wherein:

the processor of the host user system monitors the host user system for the addition of the file to the host user system comprises monitoring the host user system for the addition of the file from a web-based electronic mail service to the host user system and detects the addition of the file to the host user system by detecting a transfer of the file from the web-based electronic mail service to the host user system.

14. The non-transitory computer-readable medium of claim 13, wherein the web-based electronic mail service comprises one or more of:
WINDOWS LIVE™ HOTMAIL® service;
YAHOO! MAIL service;
GMAIL™ service; and
MOBILEME® service.

15. The non-transitory computer-readable medium of claim 13, wherein:
the file comprises an attachment to an email accessed using the web-based electronic mail service;
the processor of the host user system monitoring the host user system for the addition of the file from a web-based electronic mail service to the host user system by monitoring the host user system for a download of the attachment from the web-based electronic mail service to the host user system and detecting the addition of the file from the web-based electronic mail service to the host user system by detecting the transfer of the attachment from the web-based electronic mail service to the host user system.

16. The non-transitory computer-readable medium of claim 9, further comprising initiating communication over the communication network by the second processor of information associated with the detected addition of the file by invoking a web service call to the malware analysis system.

17. A computer-implemented method, comprising:
monitoring, by a first processor of a host user system, a host user system for addition of a file to the host user system;
detecting, by the first processor of the host user system, the addition of the file to the host user system;
accessing, by the first processor of the host user system, one or more policies to determine whether to communicate the information associated with the detected addition of the file over a communication network to an intermediary to initiate a possible malware analysis of the file by a remote malware analysis system;
initiating by the first processor of the host user system, in response to determining to communicate the information associated with the detected addition of the file over the communication network to the intermediary, a communication over the communication network of the information associated with the detected addition of the file to the intermediary;
coordinating, by a second processor of the intermediary, monitoring the host user system and receiving, by the second processor of the intermediary, the information associated with the detected addition of the file at the host user system prior to being forwarded to a remote malware analysis system;
accessing the one or more policies by the second processor of the intermediary to determine whether to communicate, over the communication network, the information associated with the detected addition of the file received from the host user system to the remote malware analysis system to initiate the malware analysis of the file by the remote malware analysis system; and
determining by the second processor of the intermediary, based on the one or more policies, what information associated with the detected addition of the file to communicate over the communication network to the remote malware analysis system;
wherein the information comprises one or more of the following:
identification information for the host user system;
identification of a manner in which the file was attempted to be added to the host user system; and
timestamp information.

* * * * *

UNITED STATES PATENT AND TRADEMARK OFFICE
CERTIFICATE OF CORRECTION

PATENT NO. : 8,627,404 B2
APPLICATION NO. : 13/216317
DATED : January 7, 2014
INVENTOR(S) : McDougal et al.

Page 1 of 1

It is certified that error appears in the above-identified patent and that said Letters Patent is hereby corrected as shown below:

Specification

In column 3, line 13, delete "computer" and insert --user--, therefor

In column 6, line 33, before "network", insert --communication--, therefor

In column 6, line 40, delete "122" and insert --134--, therefor

In column 8, line 17, delete "software." and insert --software,--, therefor

In column 8, line 48, before "network", insert --communication--, therefor

In column 8, line 53, delete "136" and insert --138--, therefor

In column 8, line 67, before "network", insert --communication--, therefor

In column 11, line 46, before "network", insert --communication--, therefor

In column 11, line 67, delete "200," and insert --100,--, therefor

In column 13, line 28, delete "210" and insert --202--, therefor

In column 14, line 3, after "nodes", delete "102", therefor

In column 16, line 58, delete "response" and insert --results--, therefor

In column 16, line 64, delete "node" and insert --malware analysis system--, therefor In column 20, line 66, delete "134," and insert --122,--, therefor In column 21, line 21, delete "122" and insert --134--, therefor Signed and Sealed this
Sixth Day of October, 2015

Michelle K. Lee
*Director of the United States Patent and Trademark Office*